Patented July 19, 1949

2,476,815

UNITED STATES PATENT OFFICE 2,476,815

METHOD FOR THE PREPARATION OF 1-ALKOXY-2,4-DINITRO-6-TERTIARY-BUTYL-BENZENES

Marion Scott Carpenter, Nutley, and William M. Easter, Jr., Lodi, N. J., assignors to The Givaudan Corporation, a corporation of New Jersey No Drawing. Application May 24, 1947, Serial No. 750,357

4 Claims. (Cl. 260—612)

This invention relates to novel synthetic musk materials and to a process for preparing them. More especially, the present invention relates to 1-alkoxy-2,4-dinitro-6-tertiary-butyl benzenes.

The structural formula of our novel musk materials may be represented as follows:

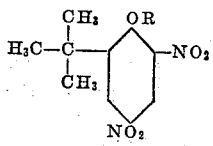

wherein R is selected from $CH_3$ and $C_2H_5$. These dinitro compounds are pale yellow crystalline materials having strong musk-like odors. They may be employed in perfumes and cosmetics.

Our novel musk materials are prepared by nitration of compounds having the structural formula:

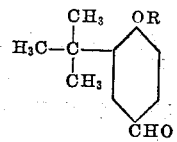

which themselves are prepared by heating a material having the structural formula:

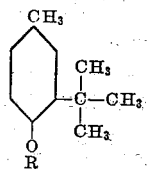

wherein R is a methyl or an ethyl radical, with an oxidation agent such as manganese dioxide in sulfuric acid, at an elevated temperature.

The non-nitrated products as above formed (and which, it will be observed are aromatic aldehydes) are treated with mixed acids (sulfuric and nitric acids) at temperatures within the range of about $-10°$ and $+20°$ C.

The following examples are given in order more fully to illustrate this invention, without however limiting the same to them.

EXAMPLE I

*Preparation of 3-tertiary-butyl-4-methoxy toluene*

330 liters of iso butylene are passed into an agitated mixture of 1,464 grams p-cresol methyl ether and 75 grams sulfuric acid 93%, at a temperature of 22°–28° C., as rapidly as the absorption of the gas will permit. About 3 hours is required. The oily reaction mixture is washed with dilute caustic soda solution and then with water until it is neutral and is then distilled in vacuo. There is first obtained 73 grams of unreacted p-cresol methyl ether, boiling at 47° C. under 3 mm. of mercury pressure, followed by 2,105 grams of the desired product boiling at 78° C. under 3 mm. of mercury pressure. This product is a colorless oil having a congealing point of 16° C.

EXAMPLE II

*Preparation of 3-tertiary-butyl-4-methoxy-benzaldehyde*

A mixture of 400 grams of 3-tertiary-butyl-4-methoxy toluene, 221 grams manganese dioxide and 2,000 grams 30% sulfuric acid is agitated vigorously for 28 hours at a temperature of 62°–65° C. After cooling to room temperature the mixture is filtered to remove a small amount of unreacted manganese dioxide, the presence of which would impede the washing of the oily layer. The lower layer containing manganese sulfate and sulfuric acid is discarded and the upper oily layer is washed to neutrality with water and distilled, preferably in vacuo. There first passes over at 80°–82° C. under a pressure of 3 mm. of mercury about 226 grams of recovered 3-tertiary-butyl-4-methoxy toluene. After an intermediate fraction of about 4 grams there is then collected at 117°–122° C. under the same pressure about 187 grams of 3-tertiary-butyl-4-methoxy benzaldehyde, which rapidly solidifies to a solid mass. After recrystallization from half its weight of naphtha, there is obtained about 170 grams of purified aldehyde. It is a colorless crystalline material melting at 54°–55° C. and having a somewhat empyreumatic odor of the "cuir de Russe" type.

EXAMPLE III

*Preparation of 1-methoxy-2 4 dinitro-6-tertiary-butyl benzene*

A solution of 48 grams 3-tertiary-butyl-4-methoxy benzaldehyde in 50 grams chloroform is added with stirring and cooling to a mixture of 41 grams nitric acid 96%, 180 grams sulfuric acid 93% and 200 grams chloroform at a temperature of 0° to 10° C. When the addition is completed the mixture is quenched by pouring onto crushed ice. The chloroform solution is separated, washed with dilute caustic soda solution, then with water to neutrality and the chloroform distilled off. The residue consists of 58 grams of yellow oil which congeals to a crystalline mass upon cooling. After two crystallizations from alcohol, there is obtained about 35 grams of pure 1-methoxy-2,4-dinitro-6-tertiary-butyl benzene as pale yellow crystals melting at 80.5° to 81° C. and having a strong musk odor.

EXAMPLE IV

*Preparation of 3-tertiary-butyl-4-ethoxy toluene*

42 liters of isobutylene is passed into an agitated mixture of 204 grams p-cresol ethyl ether and 9 grams sulfuric acid 93%, at a temperature of 22°–28° C., as rapidly as the absorption of the gas will permit. About one hour is required. The oily reaction mixture is washed with dilute caustic soda solution and then with water until it is neutral and is then distilled in vacuo. There is first obtained 44 grams of unreacted p-cresol ethyl ether, boiling at 57° C. under 3 mm. of mercury pressure, followed by 224 grams of 3-tertiary-butyl-4-ethoxy toluene boiling at 84° C. under 3 mm. of mercury pressure. This product is a colorless oil having a mild characteristic odor. It has specific gravity (25° C.) .915 and upon slight cooling congeals to a crystalline mass of melting point 22° C.

EXAMPLE V

*Preparation of 3-tertiary-butyl-4-ethoxy benzaldehyde*

A mixture of 192 grams 3-tertiary-butyl-4-ethoxy toluene, 100 grams powdered manganese dioxide and 900 grams sulfuric acid 30% is agitated for 28 hours at a temperature of 60°–65° C. The mixture is then cooled to room temperature, thinned with 200 grams benzene and filtered to remove a small amount of unreacted manganese dioxide. The lower layer containing manganese sulphate and sulfuric acid is discarded and the upper layer is washed with dilute sodium carbonate solution and then with water to neutrality, the solvent distilled off and the remainder distilled in vacuo. There is first obtained 104 grams of unreacted 3-tertiary-butyl-4-ethoxy toluene, followed by 63 grams of 3-tertiary-butyl-4-ethoxy benzaldehyde boiling at 133° C. under 3½ mm. of mercury pressure. The aldehyde soon congeals to a solid mass. After recrystallization from half its weight of naphtha, there is obtained 60 grams of pure aldehyde as colorless needles of melting point 69°–70° C. It has an empyreumatic odor quite similar to that of 3-tertiary-butyl-4-methoxy benzaldehyde, but somewhat softer.

EXAMPLE VI

*Preparation of 1-ethoxy-2,4-dinitro-6-tertiary-butyl benzene*

Proceeding as in Example III but substituting 51.5 grams of 3-tertiary-butyl-4-ethoxy benzaldehyde for the 3-tertiary-butyl-4-methoxy-benzaldehyde used in that case, there is obtained about 38 grams of 1-ethoxy-2,4 - dinitro - 6 - tertiary-butyl-benzene as pale yellow crystals melting at 79°–79.5° C. and having a strong musk odor.

The foregoing illustrates the practice of this invention which however is not to be limited thereby but is to be construed as broadly as permissible in view of the prior art and limited solely by the appended claims.

We claim:

1. The process for preparing compounds having the structural formula:

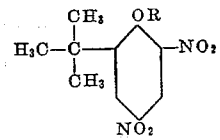

wherein R is selected from the group consisting of $CH_3$ and $C_2H_5$, which comprises treating compounds having the structural formula:

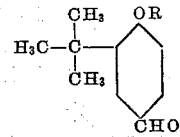

with a mixture of nitric and sulfuric acids at a temperature within the range of about −10° C. to about +20° C.

2. The process of claim 1, wherein the temperature employed is within the range of about 0° C. to about 10° C.

3. The process of claim 2, wherein the material treated is 3-tertiary-butyl-4-methoxy benzaldehyde.

4. The process of claim 2, wherein the material treated is 3-tertiary-butyl-4-ethoxy benzaldehyde.

MARION SCOTT CARPENTER.
WILLIAM M. EASTER, Jr.

REFERENCES CITED

The following references are of record in the file of this patent:

UNITED STATES PATENTS

| Number | Name | Date |
|---|---|---|
| 2,007,234 | Wirth | July 9, 1935 |

OTHER REFERENCES

Hanai: "Sci. Papers Inst. Phys. Chem. Research," (Tokio) 1931, vol. 15; abstract in English in No. 294–296. Abstracted in Chem. Abstracts, vol. 26 (1932), page 1631.

Certificate of Correction

July 19, 1949

Patent No. 2,476,815

MARION SCOTT CARPENTER ET AL.

It is hereby certified that error appears in the printed specification of the above numbered patent requiring correction as follows:

Column 4, line 21, for "$C_2H_3$" read $C_2H_5$;

and that the said Letters Patent should be read with this correction therein that the same may conform to the record of the case in the Patent Office.

Signed and sealed this 20th day of December, A. D. 1949.

[SEAL]

THOMAS F. MURPHY,
*Assistant Commissioner of Patents.*